Dec. 12, 1961 S. J. BECKER ET AL 3,012,445
TRANSMISSION
Filed Nov. 6, 1957
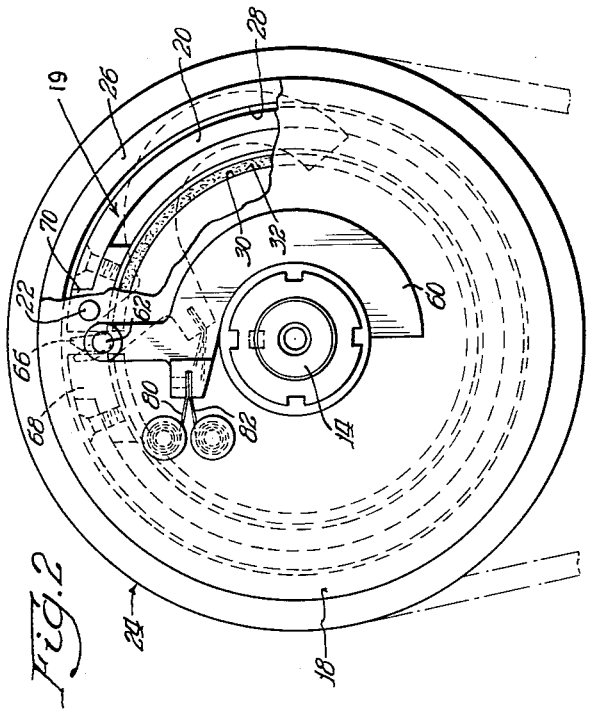
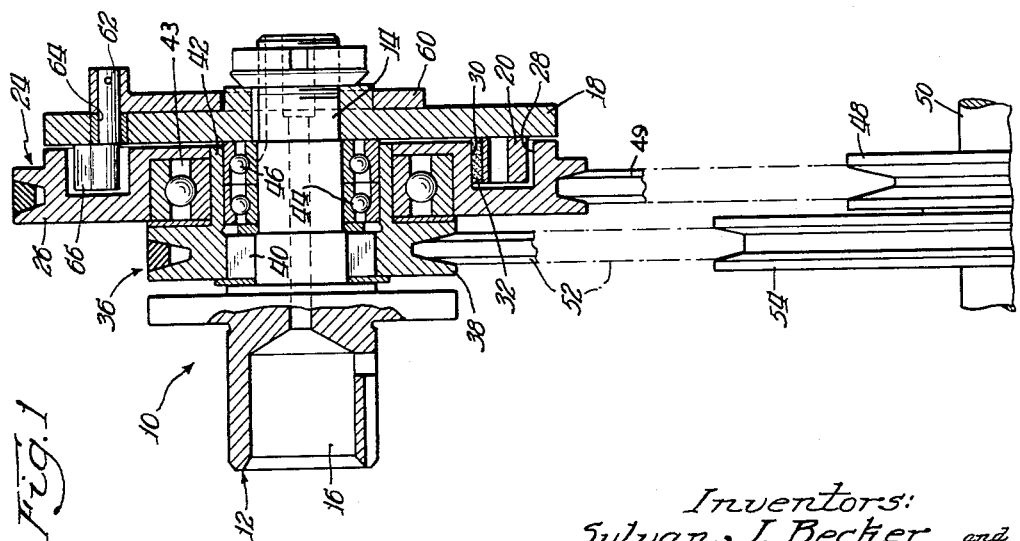
Inventors:
Sylvan J. Becker and
Raymond J. Settimi
By: Francis T Drumm  Atty.

United States Patent Office 3,012,445
Patented Dec. 12, 1961

3,012,445
TRANSMISSION
Sylvan J. Becker, Lombard, and Raymond J. Settimi, Bellwood, Ill., assignors to Borg-Warner Corporation, Chicago, Ill., a corporation of Illinois
Filed Nov. 6, 1957, Ser. No. 694,825
9 Claims. (Cl. 74—217)

This invention relates to transmissions and more particularly to a multiple speed accessory drive for motor vehicles.

Modern motor vehicles are characterized by the free use of accessories such as a generator, an air conditioning compressor, an air compressor for air suspension systems, power brakes, power steering, power windows, power antennae and the like. These accessories use considerable horse power and are generally operated at substantially engine speed. This speed is excessive for operation of accessories and results in unnecessary wear. The engine cooling fan for instance may be efficiently operated at a speed lower than engine speed when the vehicle is traveling fast due to the fact that the motion of the vehicle produces sufficient cooling air. In addition, when the cooling fan is operated at high speed a bothersome whine is produced. Furthermore, most of the accessories used today are inefficient at vehicle speeds up to thirty miles per hour. As a result, difficulty has been experienced in operating power steering units, for instance, at low vehicle speeds, as when parking. Also, the increased electrical load effects battery discharge when the vehicle engine is idling. Desirably all of the accessories should operate at a predetermined constant speed lower than the engine operating speed but higher than idling speed. Attempts have been made to construct an economically feasible transmission capable of affording a constant speed accessory drive. These attempts have been unsuccessful in that the devices have been extremely complex and expensive.

Accordingly, a primary object of the present invention is to obviate the disadvantages of present accessory drives by providing a transmission capable of operating the accessories at a relatively high speed range when the vehicle engine is operating at low speeds, and a relatively low speed range when the vehicle engine is operating at high speeds.

A further object of the invention is to provide an efficient and effective transmission of the stated type in which the shift from the high speed range to the lower speed range is in response to engine speed.

A further object of the invention is to provide an automotive vehicle accessory drive in which the accessories may be operated at a reduced noise level.

Another object of the invention is to provide a transmission of the stated type having a driving member and a pair of driven members one of which is normally drivingly connected to the driving member and is disengageable therefrom at a predetermined engine speed, and a second driven member normally in overrunning relation to the driving member and adapted to be driven by the driving member for operation of the accessories at a speed lower than engine speed.

A further object of the invention is to provide a transmission of the mentioned character in which one of the driven members may be disengaged when the engine speed reaches a predetermined level by means of a centrifugal arm and wherein the centrifugal arm is characterized by positive movement when urged either to the disengaging position or the engaged position.

A further object of the invention is to provide an accessory drive transmission for operating vehicle accessories at two different speed ranges wherein there is provided an input member and a pair of output members selectively connectible with the input member in response to the speed of rotation of the input member.

Another object of the invention is to provide a multiple speed accessory drive in which one of the output members normally is engaged and normally maintains the other of the output members in an overrunning condition and in which disengagement of the normally engaged output member in response to the speed of the input member terminates the overrunning condition of the other output member and affords a driving connection at a different speed ratio between the input member and the other output member.

A further object of the invention is to provide a multiple speed accessory drive in which one of the output members is disengaged at a predetermined speed level of the input member by means of a centrifugal arm which is positively returned to its inoperative position by means of a constant rate spring.

Another object of the invention is to provide a multiple speed drive for automotive vehicle accessories wherein power is transmitted to one of the output members by means of a clutch characterized by a rotating band.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view of an accessory drive transmission made in accordance with the present invention; and FIGURE 2 is an elevational view of the transmission of FIGURE 1 as viewed from the right in that figure.

Referring now to the drawings and more particularly to FIGURE 1, the transmision of the present invention is indicated generally by reference numeral 10 and includes an input member 12, including a driving shaft on input shaft 14 having at one end thereof a socket 16 for reception of the front end of an engine crank shaft, a drive plate 18 affixed to the shaft 14, a band clutch 19 including a spring ring 20 secured to the plate 18 by means of a pin 22 (see figures). A first output member 24 includes a pulley or sheave 26 having an annular recess 28 defined in part by an axially extending annular surface 30 which is normally engaged by a friction facing 32 secured to the inner surface of the spring ring 20. A second output member 36 is shown as comprising a pulley 38 rotatably mounted on a one-way clutch 40, mounted on the shaft 14, and having an axially extending flange 42 spaced from the shaft 14 by means of a pair of roller bearings 44, 46. Mounted on the flange 42, in surrounding relation thereto, is a ball bearing 43, on the outer race of which the pulley 26 is positioned.

It will be noted that the pulley or sheave 26 is larger in diameter than the pulley 38. The pulley 26 is shown as being connected, by means of a belt 49, to a pulley 48 of less diameter for rotation of an accessory drive shaft or output shaft 50 at a rate of speed higher than engine speed when the engine speed is in a low speed range, while the pulley or sheave 38 is shown as connected by means of a belt 52 to a pulley or sheave 54, of larger diameter, for operation of the accessory shaft 50 at a speed range lower than the engine speed when the vehicle engine is operating at a high speed range. The manner in which the load is shifted from the pulley 36 to the pulley 38 will now be described.

According to the present invention, the pulley 26 through the medium of the belt 49 rotates the pulley 48, at low engine speeds, at a speed greater than the speed of rotation of the shaft 14. The accessory shaft 50 is thus operated at a greater speed than the shaft 14, at low engine speeds, and the pulley or sheave 38 is driven by the pulley or sheave 54 at a speed even greater than that of the sheave 50 through the medium of the belt 52. The clutch 40 normally overruns and is engaged only when the speed of rotation of the pulley 38 becomes less than the speed of rotation of the shaft 14.

The band clutch 19, mentioned previously, is normally engaged and the pulley 26, at low engine speeds, normally transmits power to the pulley 48 for operation of the accessory shaft 50 at a sufficient speed to assure efficient operation of the accessories even when the vehicle engine is idling. When the speed of rotation of the shaft 14 and the drive plate 18 reaches a predetermined level, a centrifugal arm 60 which is affixed to a pin 62 passing through an opening 64 in the drive plate 18 is swung outwardly for rotation of a cam 66, secured to the inner end of the pin 62, in a counterclockwise direction, as viewed in FIGURE 2, to urge the free end of the spring ring 20, indicated by reference numeral 68, away from the other end of the ring which is indicated by reference numeral 70, and, as mentioned previously, is secured to the drive plate 18 by means of the pin 22. This movement of the spring ring 20 moves the friction facing 32 out of contact with the surface 30, and thus the pulley 26 is disengaged. As a result, the pulley 48 is momentarily slowed and, since the pulley 38 is no longer driven by the pulley 26 through the medium of the pulleys 48 and 54, the speed of the shaft 14 quickly exceeds that of the pulley 38, the one-way clutch 40 is engaged, and thence power is transmitted by means of the pulley 38 to the pulley 54 for rotation of the accessory shaft 50 at a speed range substantially lower than the engine speed.

According to the present invention, the arm 60 is returned to the position shown in FIGURE 2 by means of constant rate springs 80 and 82. The springs 80 and 82 are characterized by uniform resistance to deformation and are preferably of the type manufactured by the Hunter Spring Company and marketed under the trade name Negator. By the use of springs of this type, the tendency for the arm 60 to move outwardly in response to an increase in speed at the input shaft 14 is momentarily deterred until sufficient centrifugal force is accrued to overcome the force of the springs 80 and 82, which being characterized by constant load, do not permit gradual nudging of the cam 66 with the confronting surface of the ends 68 and 70 of the spring ring 20. It will be noted that the cam 66 in the position of the arm 60 shown in FIGURE 2, is slightly spaced from the confronting surface of the ends 68 and 70 to assure efficient operation of the band clutch in event of wear of the friction facing or liner 32.

In operation at lower engine speeds, power is transmitted from the shaft 14 to the pulley 26 by means of the drive plate 18 and the spring ring 20. As the engine speed increases, the pulley 26 is rotated at an increased rate of speed until the centrifugal force of the arm 60 exceeds the power of the springs 80 and 82. At this time, the arm 60 suddenly swings outwardly about the axis of the pin 62 to the position shown in dotted lines in FIGURE 2. In this position, the springs 80 and 82 are extended as illustrated and exert a constant pressure tending to urge the arm 60 back to the position shown in solid lines. This return movement, of course, does not occur while the centrifugal force acting on the arm 60, particularly in the shifted position of the mass of the arm, exceeds the power of the spring. Disengagement of the band clutch 19 effects engagement of the clutch 40 and the pulley 38, as explained above. Power is transmitted in this manner until the speed of the rotation of the shaft 14 drops to a predetermined level, at which time the arm 60 moves inwardly to the position shown as solid line in FIGURE 2 the cam 62 is returned to the position shown in FIGURE 2 the ring 20 again engages the surface 30 and power is again transmitted by means of the pulley 26.

While we have described our invention in connection with certain specific constructions and arrangements, it is to be understood that this is by way of illustration and not by way of limitation and the scope of our invention is defined solely by the appended claims which should be construed as broadly as the prior art will permit.

We claim:

1. A multiple speed transmission for driving accessories in an automotive vehicle comprising an input shaft adapted to be drivingly connected to the vehicle engine, a first output member, a clutch drivingly connecting said output member to said input shaft at low input shaft speeds, a second output member of less diameter than said first output member, an overrunning clutch mounted on said shaft, said second output member being mounted on said overrunning clutch, centrifugally responsive means for disengaging said first clutch and permitting engagement of said second clutch at a predetermined engine speed, and means for returning said centrifugal responsive means to rest position upon reduction in engine speed, said last named means including a constant rate spring.

2. A multiple speed transmission for driving accessories in an automotive vehicle comprising an input shaft, an output shaft, a first pulley, connected to said input shaft for driving said output shaft, a first clutch drivingly connecting said first pulley to said input shaft for driving said output shaft at a predetermined speed higher than engine speed, a second pulley of less diameter than said first pulley, a one-way clutch mounted on said input shaft, said second pulley being mounted on said one-way clutch and overrunning said input shaft at low input shaft speeds, centrifugally responsive means operative to disengage said first clutch for termination of the driving of said output shaft through said first pulley, said one way clutch being engageable when the speed of said output shaft equals the speed of said input shaft, and means for restoring said centrifugal responsive means to its rest position, said last named means including a constant rate spring.

3. An accessory drive for automotive vehicles and the like comprising an input member adapted to be driven by a vehicle engine, a first output member having an annular recess at one face thereof defined in part by an axially extending outwardly facing cylindrical surface, a clutch normally connecting said input member with said first output member, said clutch including a split spring ring having a friction face normally engaging the outwardly facing cylindrical surface of said recess, said split spring ring being effective to compress said friction face inwardly to engage said outwardly facing cylindrical surface, a one-way clutch mounted on said input member, and a second output member mounted on said one-way clutch, said second output member having an integrally formed axially extending annular flange underlying said first output member, said first output member being normally operative to maintain said one-way clutch in overrunning condition, said first named clutch being disengageable at a predetermined speed value of said input member so that the accessory load is carried by said second output member.

4. An accessory drive for automotive vehicles and the like comprising an input shaft, a first output pulley, said first output pulley having at one face thereof an annular recess defined in part by an axially extending outwardly facing cylindrical surface, a clutch normally drivingly connecting said input shaft and said first output pulley, said clutch including a drive plate mounted on said input shaft and a split spring ring fixed to said drive plate, said split ring having a friction facing normally engaging said outwardly facing surface, said split spring ring being effective to compress said friction face inwardly to engage said outwardly facing cylindrical surface, an output shaft adapted to be driven by said first output pulley through belt means at a speed greater than the speed of said input shaft, a second output pulley, said second output pulley having an annular flange extending axially into underlying relationship to said first output pulley, a one-way clutch interposed between said second output pulley and said input shaft, means drivingly connecting said second output pulley with said output shaft, said second output pulley being normally maintained in overrunning relation with respect to said input shaft by means of said first output pulley and said output shaft, and centrifugally responsive means operative to disengage said first named clutch at a predetermined speed value of said input shaft whereby the overrunning relation of said second output pulley is terminated and said output shaft is driven by said second output pulley.

5. An accessory drive for automotive vehicles comprising an input member adapted to be driven by a vehicle engine, a first output member, a second output member, an output shaft, means drivingly connecting said first output member and said second output member with said output shaft, a clutch drivingly connecting said input member with said first output member at relatively low input member speeds so that said output shaft is driven at a speed greater than the speed of said input member, a one-way clutch connecting said second output member to said input member, said second output member at relatively low input member speeds being maintained in overrunning relation with respect to said input member by means of said first output member and said output shaft, centrifugally responsive means operative upon actuation to disengage said first named clutch so that the overrunning relation of said second output member is terminated and the load of said output shaft is assumed by said second output member, and means for returning said centrifugally responsive means to its rest position when the speed of the input shaft decreases, said last named means including a constant rate spring.

6. An accessory drive in accordance with claim 5 wherein said first named clutch includes a split ring engageable with said first output member and wherein said first output member is driven by said split ring.

7. An accessory drive in accordance with claim 6 wherein said centrifugally responsive means is operative upon actuation to expand said split ring out of engagement with said first output member.

8. An accessory drive for an automotive vehicle comprising an input shaft adapted to be connected at one end to the drive shaft of a vehicle engine, a drive plate fixed to said input shaft for rotation therewith, a first pulley rotatably mounted with respect to said input shaft, a second pulley mounted in surrounding relation to said input shaft, said second pulley having an axially extending annular flange underlying said first pulley, bearing means interposed between said flange and said input shaft and between said flange and said first pulley, said first pulley having at one side thereof an axially extending annular recess defined in part by an outwardly facing cylindrical surface, centrifugally responsive clutch means for connecting said drive plate to said first pulley at relatively low speed of said input shaft, said drive plate having an opening in register with the recess in said first pulley, a pin received in said opening, a cam fixed to the inner end of said pin in spaced relation to the walls defining the recess, a split spring ring mounted on said drive plate and having on the inner surface thereof a friction facing, said split spring ring being constructed and arranged normally to contract so that said friction facing engages the outwardly facing cylindrical surface defining said recess, an output shaft, a third pulley and a fourth pulley fixed to said output shaft, belt means drivingly connecting said first pulley with said third pulley and said second pulley with said fourth pulley, an overrunning clutch interposed between said input shaft and said second pulley, said centrifugally responsive means including an arm affixed to said pin and pivotable about the axis of said pin under centrifugal force conditions to rotate said cam about the axis of said pin into engagement with said split ring for expanding said split ring to disengage said first-named clutch, said first-named clutch being operative at relatively low speeds of said input shaft to rotate said output shaft through the medium of said belt means and said third pulley at a speed greater than that of said input shaft and being operative through said fourth pulley and said belt means to rotate said second pulley at a speed greater than said input shaft, said overrunning clutch being operative upon termination of drive through said first-named clutch to drive said output shaft through said fourth pulley at a speed less than the speed of said input shaft.

9. An accessory drive for an automotive vehicle comprising an input shaft adapted to be connected at one end to the drive shaft of a vehicle engine, a drive plate fixed to said input shaft for rotation therewith, a first pulley rotatably mounted with respect to said input shaft, a second pulley mounted in surrounding relation to said input shaft, said second pulley having an axially extending annular flange underlying said first pulley, bearing means interposed between said flange and said input shaft and between said flange and said first pulley, said first pulley having at one side thereof an axially extending annular recess defined in part by a cylindrical surface, centrifugally responsive clutch means for connecting said drive plate to said first pulley at relatively low speed of said input shaft, said drive plate having an opening in register with the recess in said first pulley, a pin received in said opening, a cam fixed to the inner end of said pin in spaced relation to the walls defining the recess, a split ring mounted on said drive plate and having on the inner surface thereof a friction facing, said split ring being constructed and arranged normally to contract so that said friction facing engages the cylindrical surface defining said recess, an output shaft, a third pulley and a fourth pulley fixed to said output shaft, belt means drivingly connecting said first pulley with said third pulley and said second pulley with said fourth pulley, an overrunning clutch interposed between said input shaft and said second pulley, said centrifugally responsive means including an arm affixed to said pin and pivotable about the axis of said pin under centrifugal force conditions to rotate said cam about the axis of said pin into engagement with said split ring for expanding said split ring to disengage said first-named clutch, means including a constant rate spring to return said arm to rest position, said first-named clutch being operative at relatively low speeds of said input shaft to rotate said output shaft through the medium of said belt means and said third pulley at a speed greater than that of said input shaft and being operative through said fourth pulley and said belt means to rotate said second pulley at a speed greater than said input shaft, said overrunning clutch being operative upon termination of drive through said first-named clutch to drive said output shaft through said fourth pulley at a speed less than the speed of said input shaft.

References Cited in the file of this patent

UNITED STATES PATENTS

| | | |
|---|---|---|
| 1,983,827 | Winther et al. | Dec. 11, 1934 |
| 2,694,175 | Davis | Nov. 9, 1954 |
| 2,860,519 | Cavanaugh | Nov. 18, 1958 |
| 2,886,977 | Van Ausdall | May 19, 1959 |
| 2,911,962 | McRae | Nov. 10, 1959 |